US006963990B2

(12) United States Patent
Allen et al.

(10) Patent No.: US 6,963,990 B2
(45) Date of Patent: Nov. 8, 2005

(54) CLOCK GENERATION FOR MULTIPLE SECONDARY BUSES OF A PCI BRIDGE

(75) Inventors: Jonathan Michael Allen, Rochester, MN (US); Steven Paul Jones, Rochester, MN (US); Daniel Frank Moertl, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/067,785

(22) Filed: Feb. 5, 2002

(65) Prior Publication Data

US 2003/0149825 A1    Aug. 7, 2003

(51) Int. Cl.[7] .............................. G06F 1/04; G06F 1/06
(52) U.S. Cl. ....................................... 713/500; 713/600
(58) Field of Search ................................ 713/500, 600

(56) References Cited

U.S. PATENT DOCUMENTS

| 5,835,733 | A |   | 11/1998 | Walsh et al. ............... 395/281 |
|---|---|---|---|---|
| 5,848,253 | A |   | 12/1998 | Walsh et al. ............... 395/309 |
| 6,055,596 | A |   | 4/2000 | Cepulis ....................... 710/104 |
| 6,195,717 | B1 |   | 2/2001 | Henderson et al. ......... 710/101 |
| 6,226,699 | B1 | * | 5/2001 | Humpherys et al. ........ 710/100 |
| 6,275,950 | B1 | * | 8/2001 | Yeh ............................. 713/401 |
| 6,484,000 | B1 | * | 11/2002 | Ogawa et al. .............. 710/300 |
| 6,510,473 | B1 | * | 1/2003 | Voit ............................. 710/58 |

* cited by examiner

Primary Examiner—Chun Cao
(74) Attorney, Agent, or Firm—Moser, Patterson & Sheridan, LLP

(57) ABSTRACT

Embodiments are provided in which clock generation for a PCI bridge and its N attached secondary buses is carried out by using an external PLL clock generator which generates N+1 first clock signals at a first frequency to the bridge and to N multiplexers. The bridge in turn generates N second clock signals to the N multiplexers. Each of the N clock signals generated by the bridge can be at either a second or third frequency. Each of the N multiplexers passes one of the first clock signal and second clock signal to a secondary bus depending on the speed of the slowest adapter on the secondary bus.

25 Claims, 2 Drawing Sheets

CLOCK GENERATION FOR MULTIPLE SECONDARY BUSES OF A PCI BRIDGE

BACKGROUND OF THE INVENTION

1. Field of the Invention

The present invention generally relates to clock generation, and more particularly to clock generation for a PCI bridge and its attached secondary buses.

2. Description of the Related Art

Most PCI (Peripheral Component Interconnect) bridges couple one secondary PCI bus to one primary PCI bus. Conventionally, clock generation for such a PCI bridge and its attached buses can be implemented using an external phase-locked loop (PLL) clock generator. A PLL clock generator is an electronic circuit which receives an input signal and generates at least an output clock signal whose frequency is the same as or multiple of that of the input signal.

An exemplary external PLL clock generator receives as input a single 33 MHz input signal and generates as output five or more in-phase clock signals having the same frequency of 33 MHz, 66 MHz, or 133 MHz. Each of these clock signals is connected to a single load. More specifically, one of these in-phase clock signals is fed to an internal PLL circuit in the PCI bridge. This internal PLL circuit in turn generates a clock signal at the same frequency for the secondary bus's logic in the PCI bridge. Each of the remaining in-phase clock signals generated by the external PLL clock generator is connected to each of the PCI Adapters attached to the secondary PCI bus. In addition, the PCI bridge includes another internal PLL circuit to generate a clock signal for the primary bus's logic in the PCI bridge. In general, a PCI adapter is an adapter whose signals and operation conform to the PCI bus standard so that the PCI card can be coupled to a PCI bus. For example, because the PCI bus standard requires 32 Address/Data (AD) signals and 4 Command/Byte Enable signals on a PCI bus, a PCI adapter must support these signals so that it can be coupled to the PCI bus. PCI adapters are used to couple external devices to the PCI bus.

In the case of a PCI bridge which couples multiple secondary PCI buses to a primary PCI bus, the clock generation scheme described above has difficulties. For example, assume a PCI bridge couples four secondary PCI buses to a primary PCI bus. These secondary PCI buses must be able to operate at different clock rates. Using the clock generation scheme described above for this PCI bridge would require four external PLL clock generators, one for each secondary PCI bus. The PCI bridge would need five internal PLL circuits for the primary PCI bus and the four secondary PCI buses. The PCI bridge would also need five independent, asynchronous islands of logic, one for each of the primary and secondary PCI buses. Current generations of chip technology do not allow the PCI bridge and that many PLL circuits in the same chip. Moreover, that many independent, asynchronous islands of logic in the PCI bridge would increase the complexity of the PCI bridge and affect its performance.

Accordingly, there is a need for an apparatus and method in which clock generation is effectively carried out for a PCI bridge and its secondary PCI buses.

SUMMARY OF THE INVENTION

In one embodiment, a digital system comprises a bridge, a bus coupled to the bridge, a clock generator, and a multiplexer coupled to the clock generator, the bus, and the bridge. The multiplexer is configured to pass one of a first clock signal from the clock generator and a second clock signal from the bridge to the first bus.

In another embodiment, a method is used for clock generation in a digital system. The method comprises (a) providing a bridge, a bus coupled to the bridge, a clock generator, and a multiplexer coupled to the clock generator, the bus, and the bridge and (b) passing, with the multiplexer, one of a first clock signal from the clock generator and a second clock signal from the bridge to the bus.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which clock generation for a PCI bridge and its N attached secondary buses is carried out by using an external PLL clock generator which generates N+1 first clock signals at a first frequency to the bridge and to N multiplexers. The bridge in turn generates N second clock signals to the N multiplexers. Each of the N clock signals generated by the bridge can be at either a second or third frequency. Each of the N multiplexers passes one of the first clock signal and second clock signal to a secondary bus depending on the speed of the slowest adapter on the secondary bus.

Figure 1:
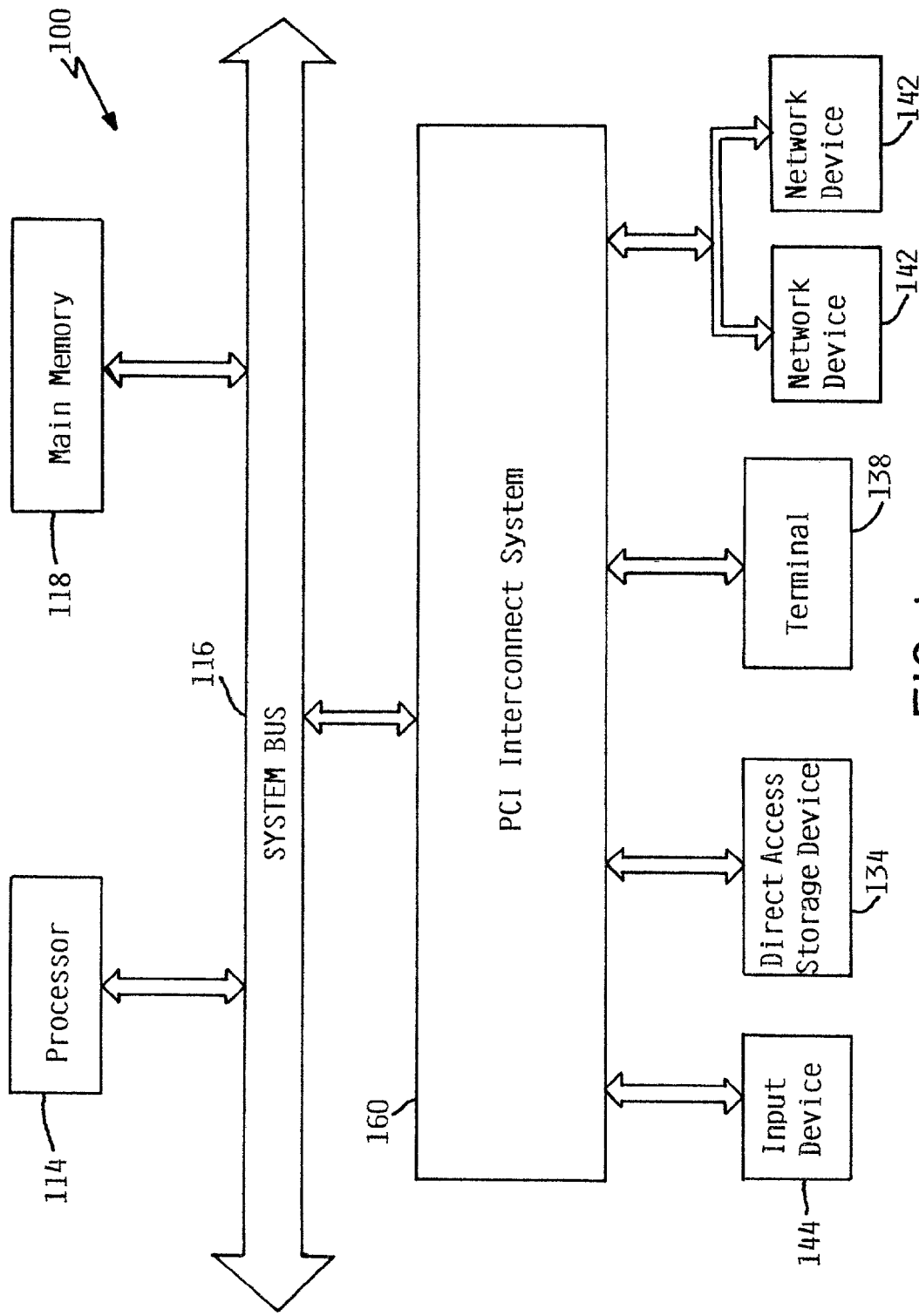
FIG. 1 shows a computer system 100 according to one embodiment.

FIG. 1 shows a computer system 100 according to one embodiment. Illustratively, the computer system 100 includes a system bus 116, a main memory 118 and at least a processor 114 coupled to the system bus 116. The computer system 100 also includes an input device 144, a storage device 134, a terminal 138, and a plurality of networked devices 142, all coupled to the system bus 116 via a PCI Interconnect System 160.

Terminal 138 is any display device such as a cathode ray tube (CRT) or a plasma screen. Terminal 138 and networked devices 142 may be desktop or PC-based computers, workstations, network terminals, or other networked computer systems. Input device 144 can be any device to give input to the computer system 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

Figure 2:
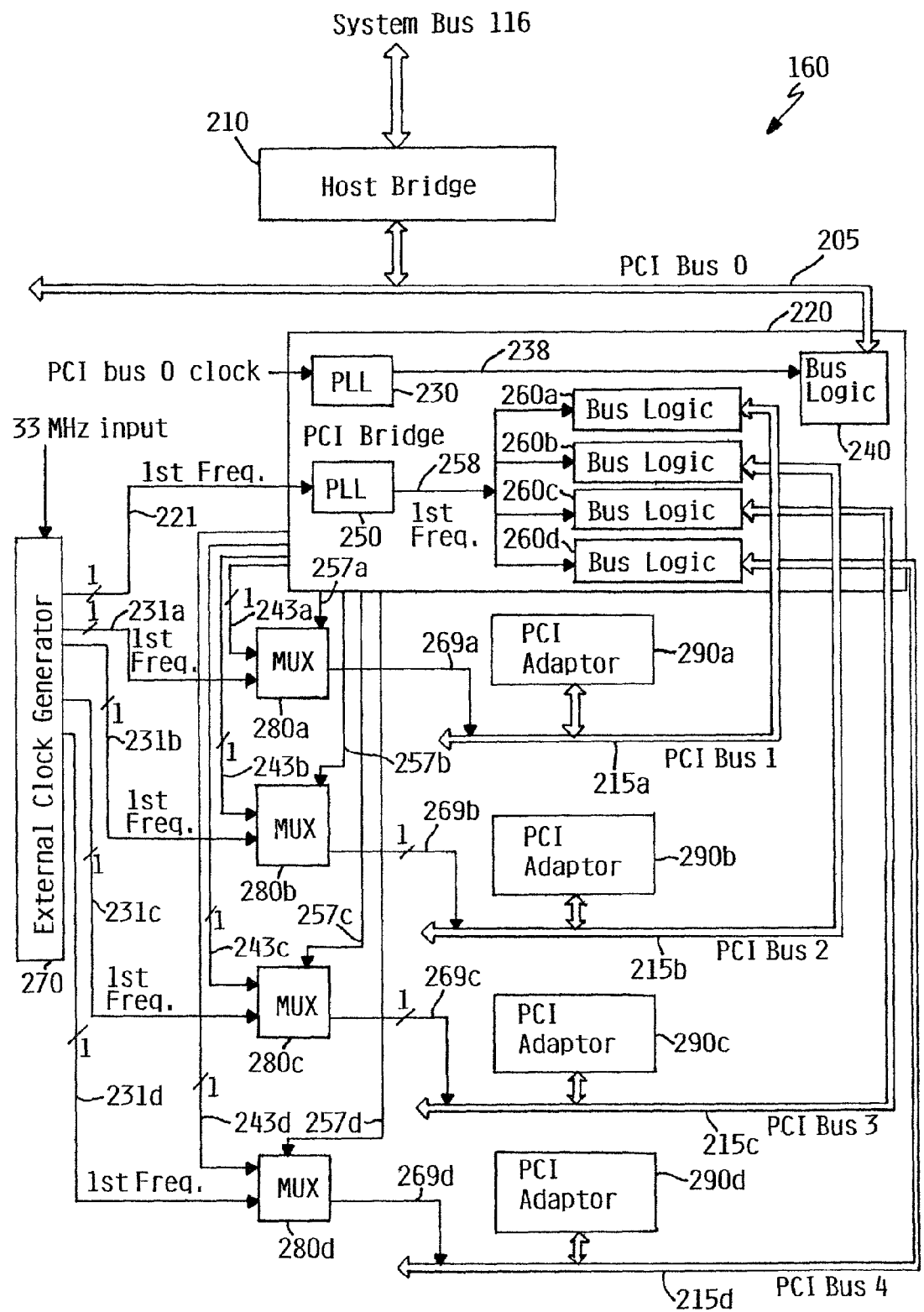
FIG. 2 shows one embodiment of the PCI Interconnect System 160 of FIG. 1.

FIG. 2 shows one embodiment of the PCI Interconnect System 160 of FIG. 1. Illustratively, the PCI Interconnect System 160 includes a Host Bridge 210, a PCI Bridge 220, an external clock generator 270, four multiplexers (MUX) 280*a*, 280*b*, 280*c*, and 280*d*, four PCI adapters 290*a*, 290*b*, 290*c*, and 290*d* (collectively, PCI adapters 290), one primary PCI bus 205 (PCI Bus 0), and four secondary PCI buses 215*a*, 215*b*, 215*c*, and 215*d* (i.e., PCI buses 1, 2, 3, and 4, respectively). In general, the PCI Interconnect System 160 may have more or less than four secondary PCI buses each of which may be coupled to no, one, or more PCI adapter.

In one embodiment, each of the adapters 290 couples the input device 144, a storage device 134, a terminal 138, or a plurality of networked devices 142 (FIG. 1) to the PCI Interconnect System 160. The Host Bridge 210 couples the primary PCI bus 205 to the system bus 116. The PCI bridge 220 couples the secondary PCI buses 215*a*, 215*b*, 215*c*, and 215*d* to the primary PCI bus 205. In one embodiment, the PCI bridge 220 includes, illustratively, two internal PLL circuits 230 & 250 and five bus logics 240, 260*a*, 260*b*, 260*c*, and 260*d*. The internal PLL circuit 230 receives as input a clock signal "PCI Bus 0 clock" and generates as output a clock signal for the bus logic 240 via a connection 238. The bus logic 240 is coupled to and supports the operation of the PCI bus 205. For example, assume the host bridge 210 sends a signal to the bus logic 240 via the PCI bus 205 to indicate that the host bridge 210 will send data to the PCI bridge 220 the next bus cycle. In response to this signal, in the next bus cycle, the bus logic 240 causes the PCI bridge 220 to get the data which the host bridge 210 puts on the PCI bus 205.

The internal PLL circuit 250 receives as input a clock signal at a first frequency from the external clock generator 270 via a connection 221 and generates as output a clock signal at the first frequency to four bus logics 260*a*, 260*b*, 260*c*, and 260*d* via a connection 258. The bus logics 260*a*, 260*b*, 260*c*, and 260*d* are coupled to and support the operation of the secondary PCI buses 215*a*, 215*b*, 215*c*, and 215*d*, respectively. For example, assume the PCI adapter 290*a* sends a signal to the bus logic 260*a* via the PCI bus 215*a* to indicate that the PCI adapter 290*a* will receive data from the PCI bridge 220 the next bus cycle. In response to this signal, in the next bus cycle, the bus logic 260*a* causes the PCI bridge 220 to put the data on the PCI bus 215*a* so that the PCI adapter 290*a* can get the data from the PCI bus 215*a*.

In one embodiment, the external clock generator 270 receives as input a 33 MHz input signal and generates as output five clock signals, all at the first frequency. One of the five clock signals generated by the external clock generator 270 is applied to the internal PLL circuit 250 via connection 221. The remaining four clock signals generated by the external clock generator 270 are applied as first inputs to the MUXes 280*a*, 280*b*, 280*c*, and 280*d* via connections 231*a*, 231*b*, 231*c*, and 231*d*, respectively.

The MUXes 280*a*, 280*b*, 280*c*, and 280*d* also receive as second inputs four clock signals from the PCI bridge 220 via connections 243*a*, 243*b*, 243*c*, and 243*d*, respectively. Each of these four clock signals from the PCI bridge 220 can be at a second frequency or a third frequency. The MUXes 280*a*, 280*b*, 280*c*, and 280*d* also receive four select signals from the PCI bridge 220 via connections 257*a*, 257*b*, 257*c*, and 257*d*. Using the four select signals, the PCI bridge 220 causes the MUXes 280*a*, 280*b*, 280*c*, and 280*d* to pass one of the two clock signals on their first and second inputs to the PCI adapters 290*a*, 290*b*, 290*c*, and 290*d*, via connections 269*a*, 269*b*, 269*c*, and 269*d*, and the secondary PCI buses 215*a*, 215*b*, 215*c*, and 215*d*, respectively. For instance, the MUX 280*a* receives as its first input a clock signal at the first frequency from the external clock generator 270 via connection 231*a*. The MUX 280*a* also receives as its second input a clock signal at the second or third frequency from the bridge 220 via connection 243*a*. Depending on the select signal from the PCI bridge 220 via connection 257*a*, the MUX 280*a* passes the clock signal on its first input or the clock signal on its second input to the PCI adapter 290*a* via connection 269*a* and the secondary PCI bus 215*a*. As a result, each of the PCI adapters 290*a*, 290*b*, 290*c*, and 290*d* can operate at the first, second, or third frequency. In other words, the secondary PCI buses 215*a*, 215*b*, 215*c*, and 215*d* can operate at different frequencies.

In one embodiment, the PCI Bridge 220 can be a PCI-X bridge and the secondary PCI buses 215*a*, 215*b*, 215*c*, and 215*d* are PCI-X buses which support a clock rate of 133 MHz. PCI-X is a bus standard which is an improvement of the PCI bus standard. One improvement is the maximum speed at which a PCI-X bus can operate. An PCI-X bus can operate at 133 MHz, whereas a PCI bus can operate at a maximum frequency of only 66 MHz. In one embodiment, the first, second, and third frequencies can be, illustratively, 133 MHz, 66 MHz, and 33 MHz, respectively. Each of the adapters 290 can be a PCI adapter (which can operate at either 33 MHz or 66 MHz) or a PCI-X adapters which can operate at up to 133 MHz. In one embodiment, the slowest adapter 290 on a secondary PCI-X bus 215 determines the clock rate at which the secondary PCI-X bus 215 operates. For instance, if the adapter 290*a* is a PCI adapter which operates at 33 MHz, the secondary PCI-X bus 215*a* must operate at 33 MHz. Accordingly, the PCI-X bridge 220 generates a 33 MHz clock signal to the MUX 280*a* via connection 243*a* and causes the MUX 280*a* to pass this 33 MHz clock signal to all adapters 290*a* on the secondary PCI-X bus 215*a*.

In another embodiment, the clock signal provided by the PLL circuit 250 is at 133 MHz. As a result, all the bus logics 260*a*, 260*b*, 260*c*, and 260*d* for the secondary PCI-X buses 215*a*, 215*b*, 215*c*, and 215*d*, respectively, operate at 133 MHz. If a secondary PCI-X bus 215 operates at 133 MHz, the PCI-X bridge 200 causes the MUX 280 to pass one of the five 133 MHz clock signals from the external clock generator 270 to the secondary PCI-X bus 215. But if the secondary PCI-X bus 215 operates at 33 or 66 MHz, the PCI-X bridge 220 provides the necessary clock signal at 33 or 66 MHz and causes the corresponding MUX 280 to pass the necessary clock signal to the secondary PCI-X bus 215.

In one embodiment, the signal propagation path length from the external PLL clock generator 270 to the PCI-X bridge 220 is the same as the signal propagation path length from the external PLL clock generator 270 to each of the adapters 290 via the corresponding MUX 280. More specifically, the signal propagation path length from the external PLL clock generator 270 to the PCI-X bridge 220 via connection 221 is the same as the signal propagation path length from the external PLL clock generator 270 to the adapter 290a via connection 231a, MUX 280a, and connection 269a. Similarly, the signal propagation path length from the external PLL clock generator 270 to the PCI-X bridge 220 via connection 221 is the same as the signal propagation path length from the external PLL clock generator 270 to the adapter 290b via connection 231b, MUX 280b, and connection 269b, and so on. As a result, even if a secondary PCI-X bus 215 operates at the highest frequency of 133 MHz, components of the PCI-X bridge 220 and the adapters 290 coupled to the secondary PCI-X bus 215 experience a minimum clock skew. In other words, the phase difference between the 133 MHz clock signal seen by the components of the PCI-X bridge 220 and the 133 MHz clock signal seen by the adapters 290 is minimum.

In the embodiments described above, only two internal PLL circuits 230 & 250 are used in the bridge 220 instead of five (one for each bus) as would be required in prior art. As a result, the two PLL circuits 230 & 250 and the bridge 220 can be relatively easily put in the same chip. In addition, the four bus logics 260a, 260b, 260c, and 260d operate synchronously from a clock signal generated by PLL circuit 250. As a result, the structure of the four bus logics 260a, 260b, 260c, and 260d is relatively simpler than four asynchronous, independent bus logics which would be required in prior art to support the four secondary PCI buses 215a, 215b, 215c, and 215d. Moreover, only one external PLL clock generator 270 is used instead of four external PLL clock generators as would be required in prior art to generate clock signals for the four secondary PCI buses 215a, 215b, 215c, and 215d.

While the foregoing is directed to embodiments of the present invention, other and further embodiments of the invention may be devised without departing from the basic scope thereof, and the scope thereof is determined by the claims that follow.

What is claimed is:

1. A digital system, comprising:
a bridge;
a first bus coupled to the bridge;
a clock generator;
a first multiplexer coupled to the clock generator, the first bus, and the bridge; wherein the first multiplexer is configured to pass one of a first clock signal from the clock generator and a second clock signal from the bridge to the first bus.

2. The digital system of claim 1, wherein the bridge is coupled to the clock generator and configured to receive from the clock generator a third clock signal which is in phase with and at a same frequency as the first clock signal.

3. The digital system of claim 2, wherein the bridge comprises a bus logic coupled to the clock generator and the first bus, wherein the bus logic is configured to receive the third dock signal and operate based on the third clock signal.

4. The digital system of claim 2, wherein the first multiplexer is further configured to receive a select signal from the bridge and pass one of the first clock signal and the second clock signal to the first bus based on the select signal.

5. The digital system of claim 4, further comprising at least two adapters coupled to the first bus, wherein the bridge is further configured to generate the second clock signal to the first multiplexer, and cause the first multiplexer to pass one of the first clock signal and the second clock signal to the first bus based on a speed of a slowest adapter on the first bus.

6. The digital system of claim 5, wherein the second clock signal is at one of at least a first frequency and a second frequency, the first frequency being different than the second frequency.

7. The digital system of claim 6, further comprising:
a second bus coupled to the bridge;
a second multiplexer coupled to the dock generator, the second bus, and the bridge; wherein the second multiplexer is configured to pass one of a fourth clock signal from the clock generator and a fifth clock signal from the bridge to the second bus.

8. The digital system of claim 1, further comprising:
a second bus coupled to the bridge;
a second multiplexer coupled to the clock generator, the second bus, and the bridge; wherein the second multiplexer is configured to pass one of a third dock signal from the clock generator and a fourth clock signal from the bridge to the second bus.

9. The digital system of claim 8, further comprising at least two adapters coupled to the second bus, wherein the bridge is further configured to generate the fourth clock signal to the second multiplexer, and cause the second multiplexer to pass one of the third clock signal and the fourth clock signal to the second bus based on a speed of a slowest adapter on the second bus.

10. The digital system of claim 9, wherein the third clock signal is in phase with and at a same frequency as the first clock signal.

11. The digital system of claim 10, wherein the fourth clock signal is at one of at least the first frequency and the second frequency.

12. A method for dock generation in a digital system, the method comprising:
providing a first bus coupled to a bridge and a first multiplexer coupled to a clock generator, the first bus, and the bridge; and
passing, by operation of the first multiplexer, one of a first clock signal from the clock generator and a second clock signal from the bridge to the first bus.

13. The method of claim 12, further comprising generating, with the clock generator, a third clock signal to the bridge, the third clock signal being in phase with and at a same frequency as the first clock signal.

14. The method of claim 13, wherein the step of passing, by the operation of the first multiplexer, one of a first clock signal from the clock generator and a second clock signal from the bridge to the first bus comprises:
applying a select signal from the bridge to the first multiplexer; and
passing, by operation of the first multiplexer, one of the first clock signal and the second clock signal to the first bus based on the select signal.

15. The method of claim 14 further comprising:
providing at least two adapters coupled to the first bus;
generating, with the bridge, the second clock signal to the first multiplexer; and passing, by operation of the first multiplexer, one of the first clock signal and the second clock signal to the first bus based on a speed of a slowest adapter on the first bus.

16. The method of claim 15, wherein the step of generating, with the bridge, the second clock signal to the first multiplexer comprises generating, with the bridge, the second clock signal at one of at least a first frequency and a second frequency, the first frequency being different than the second frequency.

17. The method of claim 16, further comprising:
providing a second bus coupled to the bridge;
providing a second multiplexer coupled to the clock generator, the second bus, and the bridge; and
passing, by the operation of the second multiplexer, one of a fourth clock signal from the clock generator and a fifth clock signal from the bridge to the second bus.

18. The method of claim 12, further comprising:
providing a second bus coupled to the bridge;
providing a second multiplexer coupled to the clock generator, the second bus, and the bridge; and
passing, by the operation of the second multiplexer, one of a third clock signal from the clock generator and a fourth clock signal from the bridge to the second bus.

19. The method of claim 18, further comprising:
providing at least two adapters coupled to the second bus;
generating, with the bridge, the fourth clock signal to the first multiplexer; and
passing, by the operation of the second multiplexer, one of the third clock signal and the fourth clock signal to the second bus based on a speed of a slowest adapter on the second bus.

20. The method of claim 19, wherein the third clock signal is in phase with and at a same frequency as the first clock signal.

21. The method of claim 20, wherein the step of generating, with the bridge, the fourth clock signal to the second multiplexer comprises generating, with the bridge, the fourth clock signal at one of at least a first frequency and a second frequency, the first frequency being different than the second frequency.

22. A digital system, comprising:
a bridge;
N buses coupled to the bridge;
a clock generator; and
N multiplexers each of which is coupled to the clock generator, the bridge, and one of the N buses, one on one; wherein each of the N multiplexer is configured to pass one of a first clock signal from the clock generator and a second clock signal from the bridge to the respective bus.

23. The digital system of claim 22, wherein each of the N buses is one of a secondary PCI bus and a secondary PCI-X bus.

24. The digital system of claim 22, wherein the bridge comprises a PLL circuit which is configured to receive a third clock signal from the clock generator which is in phase with and at a same frequency as the first clock signal.

25. The digital system of claim 24 wherein the bridge further comprises N bus logics coupled to the PLL circuit and to the N buses, one to one, wherein each of the N bus logics is configured to receive a fourth clock signal from the PLL circuit and operate based on the fourth clock signal.

* * * * *